(12) United States Patent
Zugibe et al.

(10) Patent No.: US 9,222,712 B1
(45) Date of Patent: Dec. 29, 2015

(54) METHOD AND APPARATUS FOR MEASURING AND IMPROVING EFFICIENCY IN REFRIGERATION SYSTEMS

(71) Applicant: Hudson Technologies, Inc., Pearl River, NY (US)

(72) Inventors: Kevin Zugibe, New City, NY (US); Douglas Schmidt, Tomkins Cove, NY (US)

(73) Assignee: Hudson Technologies, Inc., Pearl River, NY (US)

( * ) Notice: Subject to any disclaimer, the term of this patent is extended or adjusted under 35 U.S.C. 154(b) by 585 days.

(21) Appl. No.: 13/707,829

(22) Filed: Dec. 7, 2012

Related U.S. Application Data

(63) Continuation of application No. 12/898,289, filed on Oct. 5, 2010, now Pat. No. 8,327,653, which is a continuation of application No. 12/468,506, filed on May 19, 2009, now Pat. No. 7,805,952, which is a continuation of application No. 11/463,101, filed on Aug. 8, 2006, now Pat. No. 7,533,536, which is a continuation of application No. 11/182,249, filed on Jul. 14, 2005, now Pat. No. 7,086,240, which is a continuation of application No. 10/338,941, filed on Jan. 8, 2003, now Pat. No. 7,059,143, which is a continuation-in-part of application No. 09/577,703, filed on May 23, 2000, now Pat. No. 6,505,475.

(60) Provisional application No. 60/174,993, filed on Jan. 7, 2000, provisional application No. 60/150,152, filed on Aug. 20, 1996.

(51) Int. Cl.
| | |
|---|---|
| F25B 41/00 | (2006.01) |
| F25B 27/00 | (2006.01) |
| F25D 17/00 | (2006.01) |
| F25B 49/02 | (2006.01) |
| G05B 13/04 | (2006.01) |

(52) U.S. Cl.
CPC ............... *F25B 49/02* (2013.01); *G05B 13/04* (2013.01)

(58) Field of Classification Search
CPC .......... F25B 49/02; F25B 30/02; F25B 9/008; F25B 2339/047; F25B 2600/17; F25B 2600/2513; F25B 2700/1931; F25B 2700/21161; F25B 2309/061; G05B 13/04; F24D 19/1012; F24D 19/1039; Y02B 30/745
See application file for complete search history.

(56) References Cited

U.S. PATENT DOCUMENTS

| | | | | |
|---|---|---|---|---|
| 5,802,859 | A * | 9/1998 | Zugibe ............................. | 62/125 |
| 5,841,652 | A * | 11/1998 | Sanchez ........................... | 700/44 |
| 6,098,893 | A * | 8/2000 | Berglund et al. ................ | 236/51 |
| 6,505,475 | B1 * | 1/2003 | Zugibe et al. .................... | 62/192 |
| 6,662,578 | B2 * | 12/2003 | Pham et al. ...................... | 62/154 |
| 7,086,240 | B1 * | 8/2006 | Zugibe et al. .................... | 62/114 |
| 7,533,536 | B1 * | 5/2009 | Zugibe et al. .................... | 62/127 |
| 7,599,759 | B2 * | 10/2009 | Zugibe et al. ................... | 700/275 |
| 7,805,952 | B1 * | 10/2010 | Zugibe et al. .................... | 62/84 |
| 8,327,653 | B1 * | 12/2012 | Zugibe et al. .................... | 62/114 |
| 8,463,441 | B2 * | 6/2013 | Zugibe et al. ................... | 700/275 |
| 8,912,684 | B2 * | 12/2014 | Stahlkopf et al. ............... | 307/87 |
| 2011/0115223 | A1 * | 5/2011 | Stahlkopf et al. ................ | 290/7 |

* cited by examiner

*Primary Examiner* — Ramesh Patel
(74) *Attorney, Agent, or Firm* — Steven M. Hoffberg, Esq.; Ostrolenk Faber LLP

(57) ABSTRACT

An apparatus for optimizing an efficiency of a refrigeration system, comprising means for measuring a refrigeration efficiency of an operating refrigeration system; means for altering a process variable of the refrigeration system during efficiency measurement; and a processor for calculating a process variable level which achieves an optimum efficiency. The process variables may include refrigerant charge and refrigerant oil concentration in evaporator.

20 Claims, 6 Drawing Sheets

METHOD AND APPARATUS FOR MEASURING AND IMPROVING EFFICIENCY IN REFRIGERATION SYSTEMS

The present application is a continuation of U.S. patent application Ser. No. 12/898,289, filed Oct. 5, 2010, issued as U.S. Pat. No. 8,327,653, issued Dec. 11, 2012, which is a continuation of U.S. patent application Ser. No. 12/468,506, filed on May 19, 2009, issued as U.S. Pat. No. 7,805,952 on Oct. 5, 2010, which is a continuation of U.S. patent application Ser. No. 11/463,101, filed Aug. 8, 2006, issued as U.S. Pat. No. 7,533,536 on May 19, 2009, which is a continuation of U.S. patent application Ser. No. 11/182,249, filed Jul. 14, 2005, issued as U.S. Pat. No. 7,086,240 on Aug. 8, 2006, which is a continuation of U.S. patent application Ser. No. 10/338,941, filed Jan. 8, 2003, issued as U.S. Pat. No. 7,059,143 on Jun. 13, 2006, which is a continuation-in-part of U.S. patent application Ser. No. 09/577,703 filed May 23, 2000, now U.S. Pat. No. 6,505,475, which claims benefit of priority from U.S. Provisional Patent Application 60/150,152 filed Aug. 20, 1999, and U.S. Provisional Patent Application 60/174,993 filed Jan. 7, 2000, each of which is expressly incorporated herein by reference in its entirety.

FIELD OF THE INVENTION

The present invention relates to the fields of repair, maintenance and tuning of refrigeration systems, and more particularly for systems and methods for measuring, analyzing and improving the efficiency of refrigeration systems.

BACKGROUND OF THE INVENTION

In the field of refrigeration and chillers, the evaporator heat exchanger is a large structure, containing a plurality of parallel tubes, within a larger vessel comprising a shell, through which refrigerant flows, absorbing heat and evaporating. Outside the tubes, an aqueous medium, such as brine, circulates and is cooled, which is then pumped to the process region to be cooled. Such an evaporator may hold hundreds or thousands of gallons of aqueous medium with an even larger circulating volume.

Mechanical refrigeration systems are well known. Their applications include refrigeration, heat pumps, and air conditioners used both in vehicles and in buildings. The vast majority of mechanical refrigeration systems operate according to similar, well known principles, employing a closed-loop fluid circuit through which refrigerant flows, with a source of mechanical energy, typically a compressor, providing the motive forces.

Typical refrigerants are substances that have a boiling point below the desired cooling temperature, and therefore absorb heat from the environment while evaporating under operational conditions. Thus, the environment is cooled, while heat is transferred to another location where the latent heat of vaporization is shed. Refrigerants thus absorb heat via evaporation from one area and reject it via condensation into another area. In many types of systems, a desirable refrigerant provides an evaporator pressure as high as possible and, simultaneously, a condenser pressure as low as possible. High evaporator pressures imply high vapor densities, and thus a greater system heat transfer capacity for a given compressor. However, the efficiency at the higher pressures is lower, especially as the condenser pressure approaches the critical pressure of the refrigerant. It has generally been found that the maximum efficiency of a theoretical vapor compression cycle is achieved by fluids with low vapor heat capacity, associated with fluids with simple molecular structure and low molecular weight.

Refrigerants must satisfy a number of other requirements as best as possible including: compatibility with compressor lubricants and the materials of construction of refrigerating equipment, toxicity, environmental effects, cost availability, and safety.

The fluid refrigerants commonly used today typically include halogenated and partially halogenated alkanes, including chlorofluorocarbons (CFCs), hydrochlorofluorocarbons (HFCFs), and less commonly hydrofluorocarbons (HFCs) and perfluorocarbons (PFCs). A number of other refrigerants are known, including propane and fluorocarbon ethers. Some common refrigerants are identified as R11, R12, R22, R500, and R502, each refrigerant having characteristics that make them suitable for different types of applications.

A refrigeration system typically includes a compressor, which compresses gaseous refrigerant to a relatively high pressure, while simultaneously heating the gas, a condenser, which sheds the heat from the compressed gas, allowing it to condense into a liquid phase, and an evaporator, in which the liquefied refrigerant is again vaporized, withdrawing the heat of vaporization from a process. The compressor therefore provides the motive force for active heat pumping from the evaporator to the condenser. The compressor typically requires a lubricant, in order to provide extended life and permit operation with close mechanical tolerances. Normally, the gaseous refrigerant and liquid lubricant are separated by gravity, so that the condenser remains relatively oil free. However, over time, lubricating oil migrates out of the compressor and its lubricating oil recycling system, into the condenser. Once in the condenser, the lubricating oil becomes mixed with the liquefied refrigerant and is carried to the evaporator. Since the evaporator evaporates the refrigerant, the lubricating oil accumulates at the bottom of the evaporator. The oil in the evaporator tends to bubble, and forms a film on the walls of the evaporator tubes. In some cases, such as fin tube evaporators, a small amount of oil enhances heat transfer and is therefore beneficial. In other cases, such as nucleation boiling evaporator tubes, the presence of oil, for example over 1%, results in reduced heat transfer. See, Schlager, L. M., Pate, M. B., and Berges, A. E., "A Comparison of 150 and 300 SUS Oil Effects on Refrigerant Evaporation and Condensation in a Smooth Tube and Micro-fin Tube", ASHRAE Trans. 1989, 95(1):387-97; Thome, J. R., "Comprehensive Thermodynamic Approach to Modelling Refrigerant-Lubricating Oil Mixtures", Intl. J. HVAC&R Research (ASHRAE) 1995, 110-126; Poz, M. Y., "Heat Exchanger Analysis for Nonazeotropic Refrigerant Mixtures", ashrae Trans. 1994, 100(1)727-735 (Paper No. 95-5-1).

Several mechanisms are available seeking to control lubricating oil buildup in the evaporator. One mechanism provides a shunt for a portion of mixed liquid refrigerant and oil in the evaporator to the compressor, wherein the oil is subject to the normal recycling mechanisms. This shunt, however, may be inefficient and is difficult to control. Further, it is difficult to achieve and maintain low oil concentrations using this method.

It is also known to periodically purge the system, recycling the refrigerant with purified refrigerant and cleaning the system. This technique, however, generally permits rather large variance in system efficiency or relatively high maintenance costs. Further, this technique generally does not acknowledge that there is an optimum level of oil in the evaporator and, for example, the condenser. Thus, typical maintenance seeks to produce a "clean" system, subject to incremental changes after servicing.

It is thus known that the buildup of large quantities of refrigerant oil within an evaporator, which passes in small amounts from the compressor to the condenser as a gas, and which leaves the condenser and passes to the evaporator as a liquid, will reduce efficiency of the system, and further, it is known to provide in-line devices which continuously remove refrigerant oil from the refrigerant entering the evaporator. These devices include so-called oil eductors.

The inefficiency of these continuous removal devices is typically as a result of the bypassing of the evaporator by a portion of the refrigerant, and potentially a heat source to vaporize or partially distill the refrigerant to separate the oil. Therefore, only a small proportion of the refrigerant leaving the condenser may be subjected to this process, resulting in poor control of oil level in the evaporator and efficiency loss.

It is also known to reclaim and recycle refrigerant from a refrigeration system to separate oil and provide clean refrigerant. This process is typically performed manually and requires system shutdown.

Systems are available for measuring the efficiency of a chiller, i.e., a refrigeration system which cools water or a water solution, such as brine. In these systems, the efficiency is calculated based on Watt-hours of energy consumed (Volts×Amps×hours) per cooling unit, typically tons or British Thermal Unit (BTU) (the amount of energy required to change the temperature of one British ton of water 1° C.

Thus, a minimal measurement requires a clock, voltmeter, ammeter, and thermometers and flowmeters for the inlet and outlet water. Typically, further instruments are provided, including a chiller water pressure gage, gages for the pressure and temperature of evaporator and condenser. A data acquisition system is also typically provided to calculate the efficiency, in BTU/kWH.

The art, however, does not provide systems intended to measure the operating efficiency of commercial chillers, while permitting optimization of the system.

It is known that the charge conditions of a chiller may have a substantial effect on both system capacity and system operating efficiency. Simply, the level of refrigerant charge in a chiller condenser directly relates to the cooling capacity of the system, all other things being equal. Thus, in order to handle a larger heat load, a greater quantity of refrigerant is required. However, by providing this large refrigerant charge, the operating efficiency of the system at reduced loads is reduced, thus requiring more energy for the same BTU cooling. Bailey, Margaret B., "System Performance Characteristics of a Helical Rotary Screw Air-Cooled Chiller Operating Over a Range of Refrigerant Charge Conditions", ASHRAE Trans. 1998 104(2), expressly incorporated herein by reference. Therefore, by correctly selecting the "size" (e.g., cooling capacity) of the chiller, efficiency is enhanced. However, typically the chiller capacity is determined by the maximum expected design load, and thus for any given design load, the quantity of refrigerant charge is dictated. Therefore, in order to achieve improved system efficiency, a technique of modulation recruitment is employed, in which one or more of a plurality of subsystems are selectively activated depending on the load, to allow efficient design of each subsystem while permitting a high overall system load capacity with all subsystems operational. See, Trane "Engineer's Newsletter" December 1996, 25(5):1-5. Another known technique seeks to alter the rotational speed of the compressor. See, U.S. Pat. No. 5,651,264, expressly incorporated herein by reference.

Chiller efficiency generally increases with chiller load. Thus, an optimal system seeks to operate system near its rated design. Higher refrigerant charge level, however, results in deceased efficiency. Further, chiller load capacity sets a limit on the minimum refrigerant charge level. Therefore, it is seen that there exists an optimum refrigerant charge level for maximum efficiency.

Chiller efficiency depends on several factors, including subcooling temperature and condensing pressure, which, in turn, depend on the level of refrigerant charge, nominal chiller load, and the outdoor air temperature. First, subcooling within the thermodynamic cycle will be examined. FIG. 6A shows a vapor compression cycle schematic and FIG. 6B shows an actual temperature-entropy diagram, wherein the dashed line indicates an ideal cycle. Upon exiting the compressor at state 2, as indicated in FIG. 6A, a high-pressure mixture of hot gas and oil passes through an oil separator before entering the tubes of the remote air-cooled condenser where the refrigerant rejects heat (Qh) to moving air by forced convection. In the last several rows of condenser coils, the high-pressure saturated liquid refrigerant should be subcooled, e.g., 10 F to 200 F (5.6 C to 11.1 C), according to manufacturer's recommendations, as shown by state 3 in FIG. 6B. This level of subcooling allows the device following the condenser, the electronic expansion valve, to operate properly. In addition, the level of subcooling has a direct relationship with chiller capacity. A reduced level of subcooling results in a shift of state 3 (in FIG. 6B) to the right and a corresponding shift of state 4 to the right, thereby reducing the heat removal capacity of the evaporator (Q1).

As the chiller's refrigerant charge increases, the accumulation of refrigerant stored in the condenser on the high-pressure side of the system also increases. An increase in the amount of refrigerant in the condenser also occurs as the load on the chiller decreases due to less refrigerant flow through the evaporator, which results in increased storage in the condenser. A flooded condenser causes an increase in the amount of sensible heat transfer area used for subcooling and a corresponding decrease in the surface area used for latent or isothermal heat transfer associated with condensing. Therefore, increasing refrigerant charge level and decreasing chiller load both result in increased subcooling temperatures and condensing temperatures.

Increased outdoor air temperatures have an opposite effect on the operation of the condenser. As the outdoor air temperature increases, more condenser surface area is used for latent or isothermal heat transfer associated with condensing and a corresponding decrease in sensible heat transfer area used for subcooling. Therefore, increases in outdoor air temperature result in decreased subcooling temperatures and increased condensing temperatures.

Referring to FIG. 6B, an increase in subcooling drives state 3 to the left, while an increase in condensing temperature shifts the curve connecting states 2 and 3 upward. High condensing temperatures can ultimately lead to compressor motor overload and increased compressor power consumption or lowered efficiency. As subcooling increases, heat is added to the evaporator, resulting in an upward shift of the curve connecting states 4 and 1. As the evaporating temperature increases, the specific volume of the refrigerant entering the compressor also increases, resulting in increased power input to the compressor. Therefore, increased levels of refrigerant charge and decreased chiller load conditions result in increased subcooling, which leads to increased compressor power input.

Control of the electronic expansion valve is based on a sensor located within the compressor's inlet where it measures superheat level. Superheat level is represented by the slight increase in temperature after the refrigerant leaves the saturation curve, as shown at state 1 in FIG. 6B. Vaporized refrigerant leaves the chiller's evaporator and enters the compressor as a superheated vapor with a recommended setpoint (2.2 C) superheat to avoid premature failure from droplet pitting and erosion.

As discussed previously, an increase in outdoor air temperature causes an increase in discharge pressure, which, in turn, causes the compressor's suction pressure to increase. The curves connecting states 2 and 3 and states 4 and 1 on FIG. 6B 3 both shift upward due to increases in outdoor air temperature. An upward shift in curves 4 through 1 or an increase in refrigerant evaporating temperature results in a decrease in the evaporating approach temperature. As the approach temperature decreases, the mass flow rate through the evaporator must increase in order to remove the proper amount of heat from the chilled water loop. Therefore, increasing outdoor air temperatures cause evaporating pressure to increase, which leads to increased refrigerant mass flow rate through the evaporator. The combined effect of higher refrigerant mass flow rate through the evaporator and reduced approach temperature causes a decrease in superheat temperatures. Therefore, an inverse relationship exists between outdoor air temperature and superheat temperatures.

With decreasing refrigerant charge, the curve connecting states 2 and 3 in FIG. 6B shifts downward and the subcooling level decreases or state 3 on the T-s diagram in FIG. 6B moves to the right. Bubbles begin to appear in the liquid line leading to the expansion device due to an increased amount of gaseous refrigerant leaving the condenser. Without the proper amount of subcooling in the refrigerant entering the expansion device (state 3 in FIG. 6B), the device does not operate optimally. In addition, a decrease in refrigerant charge causes a decrease in the amount of liquid refrigerant that flows into the evaporator and a subsequent decrease in capacity and increase in superheat and suction pressure. Thus, an inverse relationship exists between refrigerant charge level and superheat temperature.

Under extreme refrigerant undercharge conditions (below −20% charge), refrigerant undercharge causes an increase in suction pressure. In general, the average suction pressure increases with increasing refrigerant charge during all charge levels above −20%. Refrigerant charge level is a significant variable in determining both superheat temperature and suction pressure.

U.S. Pat. Nos. 4,437,322; 4,858,681; 5,653,282; 4,539,940; 4,972,805; 4,382,467; 4,365,487; 5,479,783; 4,244,749; 4,750,547; 4,645,542; 5,031,410; 5,692,381; 4,071,078; 4,033,407; 5,190,664; and 4,747,449 relate to heat exchangers and the like.

There are a number of known methods and apparatus for separating refrigerants, including U.S. Pat. Nos. 2,951,349; 4,939,905; 5,089,033; 5,110,364; 5,199,962; 5,200,431; 5,205,843; 5,269,155; 5,347,822; 5,374,300; 5,425,242; 5,444,171; 5,446,216; 5,456,841; 5,470,442; 5,534,151; and 5,749,245. In addition, there are a number of known refrigerant recovery systems, including U.S. Pat. Nos. 5,032,148; 5,044,166; 5,167,126; 5,176,008; 5,189,889; 5,195,333; 5,205,843; 5,222,369; 5,226,300; 5,231,980; 5,243,831; 5,245,840; 5,263,331; 5,272,882; 5,277,032; 5,313,808; 5,327,735; 5,347,822; 5,353,603; 5,359,859; 5,363,662; 5,371,019; 5,379,607; 5,390,503; 5,442,930; 5,456,841; 5,470,442; 5,497,627; 5,502,974; 5,514,595; and 5,934,091.

Also known are refrigerant property analyzing systems, as shown in U.S. Pat. Nos. 5,371,019; 5,469,714; and 5,514,595.

SUMMARY OF THE INVENTION

The present invention provides a system and method measuring, analyzing and manipulating the efficiency of a refrigeration system by instrumenting the refrigeration system to measure efficiency, selecting a process variable for manipulation, and altering the process variable during operation of the refrigeration system while measuring efficiency thereof. Preferably, the efficiency is recorded in conjunction with the process variables. Thus, for each system, the actual sensitivity of efficiency, detected directly or by surrogate measures, to a process variable, may be measured.

According to the present invention, multivariate optimization and control may be conducted. In the case of multivariate analysis and control, interaction between variables or complex sets of time-constants may require a complex control system. A number of types of control may be implemented to optimize the operation of the system.

Typically, after the appropriate type of control is selected, it must be tuned to the system, thus defining efficient operation and the relation of the input variables from sensors on the efficiency of the system. Often, controls often account for time delays inherent in the system, for example to avoid undesirable oscillation or instability. In many instances, simplifying presumptions, or segmentations are made in analyzing the operating space to provide traditional analytic solutions to the control problems. In other instances, non-linear techniques are employed to analyze the entire range of input variables. Finally, hybrid techniques are employed using both non-linear techniques and simplifying presumptions or segmentation of the operating space.

For example, in one embodiment of the invention, it is preferred that the range of operating conditions be segmented along orthogonal delineations, and the sensitivity of the system to process variable manipulation be measured for each respective variable within a segment. This, for example, permits a monotonic change in each variable during a testing or training phase, rather than requiring both increasing and decreasing respective variables in order to map the entire operating space. On the other hand, in the case of a single variable, it is preferred that the variable be altered continuously while measurements are taking place in order to provide a high speed of measurement.

It is also possible to employ a so-called adaptive control system, in which the sensitivity of the operating efficiency to small perturbations in the control variables are measured during actual operation of the system, rather than in a testing or training mode, as in an autotuning system, which may be difficult to arrange and which may be inaccurate or incomplete if the system configuration or characteristics change after training or testing. Manual tuning is typically not feasible since the characteristics of each installation over the entire operating range are not often fully characterized and are subject to change over time.

Manual tuning methods thus require an operator to run different test or trial and error procedures to determine the appropriate control parameters. Some manual tuning methods are described in D. E. Seborg, T. F. Edgar, and D. A. Mellichamp, Process Dynamics and Control, John Wiley & Sons, New York (1989) and A. B. Corripio, Tuning of Industrial Control Systems, Instrument Society of America, Research Triangle Park, N.C. (1990). Manual tuning methods have the obvious disadvantage of requiring large amounts of operator time and expertise, although the use of practical expertise may often result in an acceptable control strategy using a relatively simple controller.

Autotuning methods require an operator to periodically initiate tuning procedures, during which the controller will automatically determine the appropriate control parameters. The control parameters thus set will remain unchanged until the next tuning procedure. Some autotuning procedures are described in K. J. Astrom and T. Hagglund, Automatic Tuning of PID Controllers, Instrument Society of America, Research Triangle Park, N.C. (1988). While autotuning requires less operator time than manual tuning methods, it still requires operator intervention, and further requires an interruption of normal system operation.

With adaptive control methods, the control parameters are automatically adjusted during normal operation to adapt to changes in process dynamics. Thus, no operator intervention is required. Further, the control parameters are continuously updated to prevent the degraded performance which may occur between the tunings of the other methods. On the other hand, adaptive control methods may result in inefficiency due to the necessary periodic variance from an "optimal" condition in order to test the optimality. Further, adaptive controls may be complex and require a high degree of intelligence. Numerous adaptive control methods have been developed. See, for example, C. J. Harris and S. A. Billings, Self-Tuning and Adaptive Control: Theory and Applications, Peter Peregrinus LTD (1981). There are three main approaches to adaptive control: model reference adaptive control ("MRAC"), self-tuning control, and pattern recognition adaptive control ("PRAC"). The first two approaches, MRAC and self-tuning, rely on system models which are generally quite complex. The complexity of the models is necessitated by the need to anticipate unusual or abnormal operating conditions. Specifically, MRAC involves adjusting the control parameters until the response of the system to a command signal follows the response of a reference model. Self-tuning control involves determining the parameters of a process model on-line and adjusting the control parameters based upon the parameters of the process model. Methods for performing MRAC and self-tuning control are described in K. J. Astrom and B. Wittenmark, Adaptive Control, Addison-Wesley Publishing Company (1989). In industrial chillers, adequate models of the system are typically unavailable for implementing the control, so that self-tuning controls are preferred over traditional MRAC.

With PRAC, parameters that characterize the pattern of the closed-loop response are determined after significant setpoint changes or load disturbances. The control parameters are then adjusted based upon the characteristic parameters of the closed-loop response. A pattern recognition adaptive controller known as EXACT is described by T. W. Kraus and T. J. Myron, "Self-Tuning PID Controller uses Pattern Recognition Approach," Control Engineering, pp. 106-111, June 1984, E. H. Bristol and T. W. Kraus, "Life with Pattern Adaptation," Proceedings 1984 American Control Conference, pp. 888-892, San Diego, Calif. (1984), and K. J. Astrom and T. Hagglund, Automatic Tuning of PID Controllers, Instrument Society of America, Research Triangle Park, N.C. (1988). See also U.S. Pat. No. Re. 33,267, expressly incorporated herein by reference. The EXACT method, like other adaptive control methods, does not require operator intervention to adjust the control parameters under normal operation. Before normal operation may begin, EXACT requires a carefully supervised startup and testing period. During this period, an engineer must determine the optimal initial values for controller gain, integral time, and derivative time. The engineer must also determine the anticipated noise band and maximum wait time of the process. The noise band is a value representative of the expected amplitude of noise on the feedback signal. The maximum wait time is the maximum time the EXACT algorithm will wait for a second peak in the feedback signal after detecting a first peak. Further, before an EXACT-based controller is put into normal use, the operator may also specify other parameters, such as the maximum damping factor, the maximum overshoot, the parameter change limit, the derivative factor, and the step size. In fact, the provision of these parameters by an expert engineer is generally appropriate in the installation process for a control of an industrial chiller, and therefore such a manual definition of initial operating points is preferred over techniques which commence without a priori assumptions.

In the EXACT method, the value of the parameter change limit, which may be supplied as a predetermined constant or entered by a user, defines a range within which the parameter values of the controller are considered valid. For example, the EXACT method will not set the proportional gain of a controller to a value that exceeds the upper limit of the range defined by the parameter change limit. By specifying a valid parameter range, the EXACT method prevents the controller from using the extreme parameter values that may be a result of hardware or software errors or deficiencies. However, by constraining the parameters to values that fall within a designated range, the EXACT method prevents the use of parameter values outside the range even when such values would provide improved performance; likewise, this constraint fails to detect erroneous or artifact sensor data within the parameter change limit. Thus, an improvement over this technique provides an intelligent analysis of sensor data to perform an automated fault detection and analysis. Thus, using a model of the system constructed during operation, possibly along with manual input of probable normal operational limits, the system may analyze sensor data to determine a probability of system malfunction. If the probability exceeds a threshold, an error may be indicated or other remedial action taken.

A second known pattern recognition adaptive controller is described by Chuck Rohrer and Clay G. Nelser in "Self-Tuning Using a Pattern Recognition Approach," Johnson Controls, Inc., Research Brief 228 (Jun. 13, 1986). The Rohrer controller calculates the optimal control parameters based on a damping factor, which in turn is determined by the slopes of the feedback signal. Similar to EXACT, the Rohrer method requires an engineer to enter a variety of initial values before normal operation may commence. Specifically, an operator must specify the initial values for a proportional band, an integral time, a deadband, a tune noise band, a tune change factor, an input filter, and an output filter. This system thus emphasizes temporal control parameters.

Manual tuning of loops can take a long time, especially for processes with slow dynamics, including industrial and commercial chillers. Different methods for autotuning PID controllers are described by Astrom, K. J., and T. Hagglund, Automatic Tuning of PID Controllers, Instrument Society of American, Research Triangle Park, N.C., 1988, and Seborg, D. E. T., T. F. Edgar, and D. A. Mellichamp, Process Dynamics and Control, John Wiley & sons, 1989. Several methods are based on the open loop transient response to a step change in controller output and other methods are based on the frequency response while under some form of feedback control. Open loop step response methods are sensitive to load disturbances, and frequency response methods require a large amount of time to tune systems with long time constants. The Ziegler-Nichols transient response method characterizes the response to a step change in controller output, however, implementation of this method is sensitive to noise. See also, Nishikawa, Yoshikazu, Nobuo Sannomiya, Tokuji Ohta, and Haruki Tanaka, "A Method for Autotuning of PID Control Parameters," Automatica, Volume 20, No. 3, 1984.

For some systems, it is often difficult to determine if a process has reached a steady-state. In many systems, if the test is stopped too early, the time delay and time constant estimates may be significantly different than the actual values. For example, if a test is stopped after three time constants of the first order response, then the estimated time constant equals 78% of the actual time constant, and if the test is stopped after two time constants, then the estimated time constant equals 60% of the actual time constant. Thus, it is important to analyze the system in such a way as to accurately determine time-constants.

Thus, in a self-tuning system, the algorithm may obtain tuning data from normal perturbations of the system, or by periodically testing the sensitivity of the plant to modest perturbations about the operating point of the controlled variable(s). If the system determines that the operating point is inefficient, the controlled variable(s) are altered in order to improve efficiency toward an optimal operating point. The efficiency may be determined on an absolute basis, such as by measuring kWatt hours consumed per BTU of cooling, or through surrogate measurements of energy consumption or cooling, such as temperature differentials and flow data of refrigerant near the compressor and/or water in the secondary loop near the evaporator/heat exchanger. Thus, a full power management system (PMS) is not required in order to optimize the efficiency.

In many instances, parameters will vary linearly with load and be independent of other variables, thus simplifying analysis and permitting traditional (e.g., linear, proportional-integral-differential (PID)) control design. See, U.S. Pat. Nos. 5,568,377, 5,506,768, and 5,355,305, expressly incorporated herein by reference. On the other hand, parameters will have multifactorial dependencies which are not easily resolved. In this case, a neural network or fuzzy-neural network control is preferred. In order to train a neural network, two options are available. First, a specific training mode may be provided, in which the operating conditions are varied, generally methodically, over the entire operating space, by imposing artificial or controlled loads and extrinsic parameters on the system. Thereafter, the neural network is trained, for example by back propagation of errors, to produce an output that moves the system toward an optimal operating point for the actual load conditions. The controlled variables may be, for example, oil concentration in the refrigerant and/or refrigerant charge. See, U.S. Pat. No. 5,579,993, expressly incorporated herein by reference.

Second, the system operates in a continual learning mode in which the local operating space of the system is mapped by the control during operation, in order to determine a sensitivity of the system to perturbations in controlled process variables, such as oil concentration in the refrigerant and/or refrigerant charge. When the system determines that the present operating point is suboptimal, it alters the operating point toward a presumable more efficient condition. If the process has insufficient variability to adequately map the operating point, the control algorithm may conduct a methodical search of the space or inject a pseudorandom signal into one or more controlled variables seeking to detect the effect on the output (efficiency). Generally, such search techniques will themselves have only a small effect on system efficiency, and will allow the system to learn new conditions, without explicitly entering a learning mode after each alteration in the system.

Preferably, the control builds a map or model of the operating space from experience, and, when the actual system performance corresponds to the map or model, uses this map or model to predict an optimal operating point and directly control the system to achieve the predicted most-efficient state. On the other hand, when the actual performance does not correspond to the map or model, the control seeks to generate a new map or model.

See, U.S. Pat. No. 5,506,768, expressly incorporated herein by reference. See, also:

A. B. Corripio, "Tuning of Industrial Control Systems", Instrument Society of America, Research Triangle Park, N.C. (1990) pp. 65-81.

C. J. Harris & S. A. Billings, "Self-Tuning and Adaptive Control: Theory and Applications", Peter Peregrinus LTD (1981) pp. 20-33.

C. Rohrer & Clay Nesler, "Self-Tuning Using a Pattern Recognition Approach", Johnson Controls, Inc., Research Brief 228 (Jun. 13, 1986).

D. E. Seborg, T. F. Edgar, & D. A. Mellichamp, "Process Dynamics and Control", John Wiley & Sons, NY (1989) pp. 294-307, 538-541.

E. H. Bristol & T. W. Kraus, "Life with Pattern Adaptation", Proceedings 1984 American Control Conference, pp. 888-892, San Diego, Calif. (1984).

Francis Schied, "Shaum's Outline Series-Theory & Problems of Numerical Analysis", McGraw-Hill Book Co., NY (1968) pp. 236, 237, 243, 244, 261.

K. J. Astrom and B. Wittenmark, "Adaptive Control", Addison-Wesley Publishing Company (1989) pp. 105-215.

K. J. Astrom, T. Hagglund, "Automatic Tuning of PID Controllers", Instrument Society of America, Research Triangle Park, N.C. (1988) pp. 105-132.

R. W. Haines, "HVAC Systems Design Handbook", TAB Professional and Reference Books, Blue Ridge Summit, Pa. (1988) pp. 170-177.

S. M. Pandit & S. M. Wu, "Timer Series & System Analysis with Applications", John Wiley & Sons, Inc., NY (1983) pp. 200-205.

T. W. Kraus 7 T. J. Myron, "Self-Tuning PID Controller Uses Pattern Recognition Approach", Control Engineering, pp. 106-111, June 1984.

G F Page, J B Gomm & D Williams: "Application of Neural Networks to Modelling and Control", Chapman & Hall, London, 1993.

Gene F Franklin, J David Powell & Abbas Emami-Naeini: "Feedback Control of Dynamic Systems", Addison-Wesley Publishing Co. Reading, 1994.

George E P Box & Gwilym M Jenkins: "Time Series Analysis: Forecasting and Control", Holden Day, San Francisco, 1976.

Sheldon G Lloyd & Gerald D Anderson: "Industrial Process Control", Fisher Controls Co., Marshalltown, 1971.

Kortegaard, B. L., "PAC-MAN, a Precision Alignment Control System for Multiple Laser Beams Self-Adaptive Through the Use of Noise", Los Alamos National Laboratory, date unknown.

Kortegaard, B. L., "Superfine Laser Position Control Using Statistically Enhanced Resolution in Real Time", Los Alamos National Laboratory, SPIE-Los Angeles Technical Symposium, Jan. 23-25, 1985.

Donald Specht, IEEE Transactions on Neural Networks, "A General Regression Neural Network", November 1991, Vol. 2, No. 6, pp. 568-576.

Fuzzy controllers may be trained in much the same way neural networks are trained, using backpropagation techniques, orthogonal least squares, table look-up schemes, and nearest neighborhood clustering. See Wang, L., Adaptive fuzzy systems and control, New Jersey: Prentice-Hall (1994); Fu-Chuang Chen, "Back-Propagation Neural Networks for Nonlinear Self-Tuning Adaptive Control", 1990 IEEE Control System Magazine.

Thus, while a system model may be useful, especially for large changes in system operating parameters, the adaptation mechanism is advantageous in that it does not rely on an explicit system model, unlike many of the on-line adaptation mechanisms such as those based on Lyapunov methods. See Wang, 1994; Kang, H. and Vachtsevanos, G., "Adaptive fuzzy logic control," IEEE International Conference on Fuzzy Systems, San Diego, Calif. (March 1992); Layne, J., Passino, K. and Yurkovich, S., "Fuzzy learning control for antiskid braking systems," IEEE Transactions on Control Systems Technology 1 (2), pp. 122-129 (1993).

The adaptive fuzzy controller (AFC) is a nonlinear, multiple-input multiple-output (MIMO) controller that couples a fuzzy control algorithm with an adaptation mechanism to continuously improve system performance. The adaptation mechanism modifies the location of the output membership functions in response to the performance of the system. The adaptation mechanism can be used off-line, on-line, or a combination of both. The AFC can be used as a feedback controller, which acts using measured process outputs and a reference trajectory, or as a feedback controller with feedforward compensation, which acts using not only measured process outputs and a reference trajectory but also measured disturbances and other system parameters. See, U.S. Pat. Nos. 5,822,740, 5,740,324, expressly incorporated herein by reference.

Preferably, a particular process variable is the oil content of the refrigerant in the evaporator. To define the control algorithm, the process variable, e.g., oil content, is continuously varied by partially distilling the refrigerant at or entering the evaporator to remove oil, providing clean refrigerant to the evaporator in an autotuning procedure. Over time, the oil content will approach zero. Through this method, the optimal oil content in the evaporator and the sensitivity to changes in oil content can be determined. In a typical installation, the optimum oil concentration in the evaporator is near 0%, while when the system is retrofitted with a control system for controlling the oil content of the evaporator, it is well above optimum. Therefore, the autotuning of the control may occur simultaneously with the remediation of the inefficiency.

In fact, the oil content of the evaporator may be independently controlled, or controlled in concert with other variables, such as refrigerant charge. In this case, an external reservoir or refrigerant is provided. Refrigerant is withdrawn from the evaporator through a partial distillation apparatus into the reservoir, with the oil separately stored. Based on the control optimization, refrigerant and oil are separately returned to the system, i.e., refrigerant vapor to the evaporator and oil to the compressor loop. In this way, the optimum oil concentration may be maintained for respective refrigerant charge levels. It is noted that this system is generally asymmetric; withdrawal and partial distillation of refrigerant is relatively slow, while charging the system with refrigerant and oil are relatively quick. If rapid withdrawal of refrigerant is desired, the partial distillation system may be temporarily bypassed. However, typically it is more important to meet peak loads quickly than to obtain most efficient operating parameters subsequent to peak loads.

The optimal refrigerant charge level may be subject to variation with nominal chiller load and plant temperature, while related (dependent) variables include efficiency (kW/ton), superheat temperature, subcooling temperature, discharge pressure, superheat temperature, suction pressure and chilled water supply temperature percent error. Typically, the direct efficiency measurement of kilowatt-hours per ton requires installation of a relatively expensive electronic measurement system. Therefore, it is preferred to infer the efficiency from other variables, preferably process temperatures and flow rates. Because of the complex interdependencies of the variables, as well as the preferred use of surrogate variables instead of direct efficiency data, a non-linear neural network model may be employed, for example similar to the model employed by Bailey (1998). In this case, the model has an input layer, two hidden layers, and an output layer. The output layer typically has one node for each controlled variable, while the input layer contains one node for each signal. The Bailey neural network includes five nodes in the first hidden layer and two nodes for each output node in the second hidden layer. Preferably, the sensor data is processed prior to input into the neural network model. For example, linear processing of sensor outputs, data normalization, statistical processing, etc. may be performed to reduce noise, provide appropriate data sets, or to reduce the topological or computational complexity of the neural network. Fault detection may also be integrated in the system, either by way of further elements of the neural network (or a separate neural network) or by analysis of the sensor data by other means.

Feedback optimization control strategies are always applied to transient and dynamic situations. Evolutionary optimization or EVOP is a good example. Steady state optimization, on the other hand, is widely used on complex processes exhibiting long time constants and with disturbance variables that change infrequently. Hybrid strategies are also employed in situations involving both long-term and short-term dynamics. Obviously the hybrid algorithms are more complex and require custom tailoring for a truly effective implementation. Feedback control can sometimes be employed in certain situations to achieve optimal plant performance. Evolutionary optimization, or EVOP, is one such technique using feedback as the basis for its strategy. EVOP is an on-line experimenter. No extensive mathematical model is required, since small perturbations of the independent control variable are made directly upon the process itself. As in all optimizers, EVOP also requires an objective function. EVOP does suffer certain limitations. The process must be tolerant of some small changes in the major independent variable. Secondly, it is necessary to apply EVOP or feedback control to perturb a single independent variable at a time. If a process is encountered, such that two independent variables are considered major contributors to the objective, then it may be possible to configure the controller to examine each one sequentially at alternate sampled-data periods. This latter approach is feasible only if the process dynamics are rapid when compared with the frequency of expected changes in the disturbance variables.

Multivariable processes in which there are numerous interactive effects of independent variables upon the process performance can best be optimized by the use of feedforward control. An adequate predictive mathematical model of the process is an absolute necessity. Note that the on-line control computer will evaluate the consequences of variable changes using the model rather than perturbing the process itself.

To produce a viable optimization result, the mathematical model in a feedforward technique must be an accurate representation of the process. To ensure a one-to-one correspondence with the process, the model is preferably updated just prior to each use. Model updating is a specialized form of feedback in which model predictions are compared with the current plant operating status. Any variances noted are then used to adjust certain key coefficients in the model to enforce the required agreement.

In chillers, many of the relevant timeconstants are very long. While this reduces short latency processing demands of a real time controller, it also makes corrections slow to implement, and poses the risk of error, instability or oscillation if the timeconstants are erroneously computed. Further, in order to provide a neural network with direct temporal control sensitivity, a large number of input nodes may be required to represent the data trends. Preferably, temporal calculations are therefore made by linear computational method, with transformed time-varying data input to the neural network. For example, first and second derivatives (or higher order, as may be appropriate) of sensor data may be calculated and fed to the network. Alternately or additionally, the output of the neural network may be subjected to processing to generate appropriate process control signals. It is noted that, for example, if the refrigerant charge in a chiller is varied, it is likely that critical timeconstants of the system will also vary. Thus, a model which presumes that the system has a set of invariant timeconstants may produce errors. The control system therefore preferably employs flexible models to account for the interrelation of variables.

Other potentially useful process parameters to measure include moisture, refrigerant breakdown products, lubricant breakdown products, non-condensable gasses, and other known impurities in the refrigerant. Likewise, there are also mechanical parameters which may have optimizable values, such as mineral deposits in the brine tubes (a small amount of mineral deposits may increase turbulence and therefore reduce a surface boundary layer), and air or water flow parameters for cooling the condenser.

Typically, there are a set of process parameters which theoretically have an optimum value of 0, while in practice, achieving this value is difficult or impossible to obtain or maintain. This difficulty may be expressed as a service cost or an energy cost, but in any case, the control system may be set to allow theoretically suboptimal parameter readings, which are practically acceptable and preferable to remediation. However, at some threshold, remediation is deemed efficient. The control system may therefore monitor these parameters and either indicate an alarm, implement a control strategy, or otherwise act. The threshold may, in fact, be adaptive or responsive to other system conditions; for example, a remediation process would preferably be deferred during peak load periods if it adversely affects system performance.

Thus, it is seen that in some instances, as exemplified by oil levels in the evaporator, an initial determination of system sensitivity to the sensed parameter is preferred, while in other instances, an adaptive control algorithm is preferred.

In the case of autotuning processes, after the optimization calculations are complete, the process variable, e.g., the oil content of the evaporator, may be restored to the optimal level. It is noted that the process variable may change over time, e.g., the oil level in the evaporator will increase, so it is desired to select an initial condition which will provide the maximum effective efficiency between the initial optimization and a subsequent maintenance to restore the system to efficient operation. Therefore, the optimization preferably determines an optimum operating zone, and the process variable established at the lower end of the zone after measurement. This lower end may be zero, but need not be, and may vary for each system measured.

In this way, it is not necessary to continuously control the process variable, and rather the implemented control algorithm may, for example, include a wide deadband and manual implementation of the control process.

A monitor may be provided for the process variable, to determine when reoptimization is necessary. During reoptimzation, it is not always necessary to conduct further efficiency measurements; rather, the prior measurements may be used to redefine the desired operating regime.

Thus, after the measurements are taken to a limit (e.g., near zero oil or beyond the expected operating regime), the system is restored, if necessary, to achieve a desired initial efficiency, allowing for gradual variations, e.g., accumulation of oil in the evaporator, while still maintaining appropriate operation for a suitable period.

An efficiency measurement, or surrogate measurement(s) (e.g., compressor amperage, thermodynamic parameters) may subsequently be employed to determine when process variable, e.g., the oil level, has change or accumulated to sufficient levels to require remediation. Alternately, a direct oil concentration measurement may be taken of the refrigerant in the evaporator. In the case of refrigeration compressor oil, for example, the monitor may be an optical sensor, such as disclosed in U.S. Pat. No. 5,694,210, expressly incorporated herein by reference.

It is also possible to provide a closed loop feedback device which seeks to maintain the process variable within a desired range. Thus, a direct oil concentration gage, typically a refractometer, measures the oil content of the refrigerant. A setpoint control, proportional, differential, integral control, fuzzy logic control or the like is used to control a bypass valve to a refrigerant distillation device, which is typically oversize, and operating well within its control limits. As the oil level increases to a level at which efficiency is impaired, the refrigerant is distilled to remove oil. The oil is, for example, returned to the compressor lubrication system, while the refrigerant is returned to the compressor inlet. In this manner, closed loop feedback control may be employed to maintain the system at optimum efficiency. It is noted that it is also possible to employ an active in-line distillation process which does not bypass the evaporator. For example, the Zugibeast® system (Hudson Technologies, Inc.) may be employed, however, this is system typically larger and more complex than necessary. U.S. Pat. No. 5,377,499, expressly incorporated herein by reference, thus provides a portable device for refrigerant reclamation. In this system, refrigerant may be purified on site, rather than requiring, in each instance, transporting of the refrigerant to a recycling facility. U.S. Pat. No. 5,709,091, expressly incorporated herein by reference, also discloses a refrigerant recycling method and apparatus.

In the oil separating device, advantageously, the refrigerant is fed into a fractional distillation chamber controlled to be at a temperature below its boiling point, and therefore condenses into a bulk of liquid refrigerant remaining within the vessel. Since the refrigerant is not employed to remove heat from the water in the chiller, the amount of cooling necessary to drop the refrigerant below its boiling point (at the particular containment pressure) will approximately equal the heat absorbed from the environment plus any inefficiencies in the system, a relatively modest amount in most cases. The distillation chamber has a controlled temperature, and thus the more volatile fractions will tend to vaporize, leaving the bulk of refrigerant and less volatile fractions, including compressor oil. The vapors above the pool of refrigerant are relatively pure, while most contaminants remain in the liquid phase. As the contaminants accumulate in the liquid phase, portions may be drawn off and stored. Fresh refrigerant is fed to replace the amounts withdrawn, to operate in a steady state. The refrigerant vapors above the liquid phase are then compressed with a compressor, resulting in heating. The gasses are then cooled in a heat exchanger equillibriated with the bulk of liquid refrigerant in the distillation chamber. This heat exchanger recondenses most of the compressed gas therewithin, while the liquid refrigerant external is heated to compensate for the lost heat of vaporization of the purified refrigerant. Where the temperature of the distillation chamber rises too high, the compressed refrigerant gasses bypass the heat exchanger, thus effectively cooling the bulk of the liquid refrigerant due to the net loss of the heat of vaporization. The reliquified refrigerant is then subjected to an auxiliary compressor which sheds heat added, for example, by the primary compressor. The purified liquid refrigerant is then available.

Thus, it is seen that the process may be manual or automated, continuous or batch.

The invention derives from a relatively new understanding that the optimum oil level in the evaporator of a refrigeration system may vary by manufacturer, model and particular system, and that these variables are significant in the efficiency of the process and may change over time. The optimal oil level need not be zero, for example in fin tube evaporators, the optimal oil level may be between 1-5%, at which the oil bubbles and forms a film on the tube surfaces, increasing heat transfer coefficient. On the other hand, so-called nucleation boiling heat transfer tubes have a substantially lower optimal oil concentration, typically less than about 1%.

Seeking to maintain a 0% oil concentration may itself be inefficient, since the oil removal process may require expenditure of energy and bypass of refrigerant, and given a low but continual level of leakage. Further, the oil level in the condenser may also impact system efficiency, in a manner inconsistent with the changes in efficiency of the evaporator.

Thus, the present invention does not presume an optimum level of a particular process variable parameter. Rather, a method according to the invention explores the optimum value, and thereafter allows the system to be set near the optimum. Likewise, the method permits periodic "tune-ups" of the system, rather than requiring continuous tight maintenance of a control parameter, although the invention also provides a system and method for achieving continuous monitoring and/or control.

The refrigeration systems or chillers may be large industrial devices, for example 3500 ton devices which draw 4160V at 500 A max (2 MW). Therefore, even small changes in efficiency may produce substantial savings in energy costs. Possibly more importantly, when efficiency drops, it is possible that the chiller is unable to maintain the process parameter within the desired range. During extended operation, for example, it is possible for the oil concentration in the evaporator to increase above 10%, and the overall capacity of the system to drop below 1500 tons. This can result in process deviations or failure, which may require immediate or expensive remediation. Proper maintenance, to achieve a high optimum efficiency, may be extremely cost effective.

BRIEF DESCRIPTION OF THE DRAWINGS

The invention will now be described with reference to the accompanying drawings, in which.

DETAILED DESCRIPTION OF THE PREFERRED EMBODIMENTS

The foregoing and other objects, features and advantages of the present invention will become more readily apparent to those skilled in the art to which the invention pertains upon reference to the following detailed description of one of the best modes for carrying out the invention, when considered in conjunction with the accompanying drawing in which preferred embodiments of the invention are shown and described by way of illustration, and not of limitation, wherein:

Example 1

Figure 1:
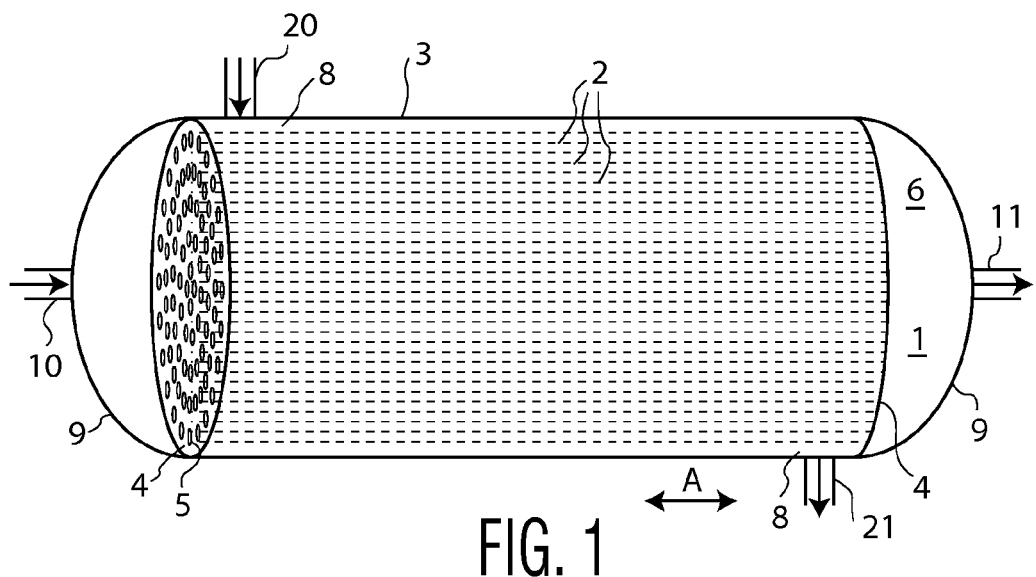
FIG. 1 is a schematic view of a known tube in shell heat exchanger evaporator.
Figure 2:
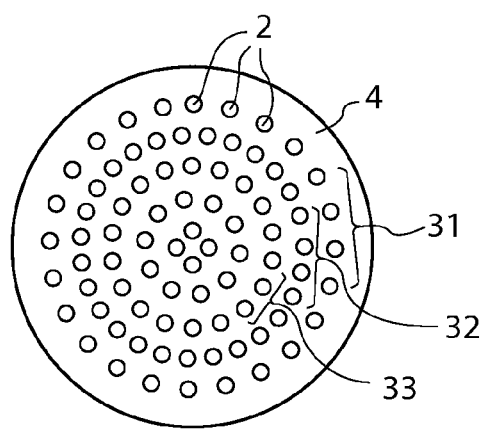
FIG. 2 shows an end view of a tube plate, showing the radially symmetric arrangement of tubes of a tube bundle, each tube extending axially along the length of the heat exchanger evaporator.

As shown in FIGS. 1-2, a typical tube in shell heat exchanger 1 consists of a set of parallel tubes 2 extending through a generally cylindrical shell 3. The tubes 2 are held in position with a tube plate 4, one of which is provided at each end 5 of the tubes 2. The tube plate 4 separates a first space 6, continuous with the interior of the tubes 7, from a second space 8, continuous with the exterior of the tubes 2. Typically, a domed flow distributor 9 is provided at each end of the shell 3, beyond the tube sheet 4, for distributing flow of the first medium from a conduit 10 through the tubes 2, and thence back to a conduit 11. In the case of volatile refrigerant, the system need not be symmetric, as the flow volumes and rates will differ at each side of the system. Not shown are optional baffles or other means for ensuring optimized flow distribution patterns in the heat exchange tubes.

Figure 3:
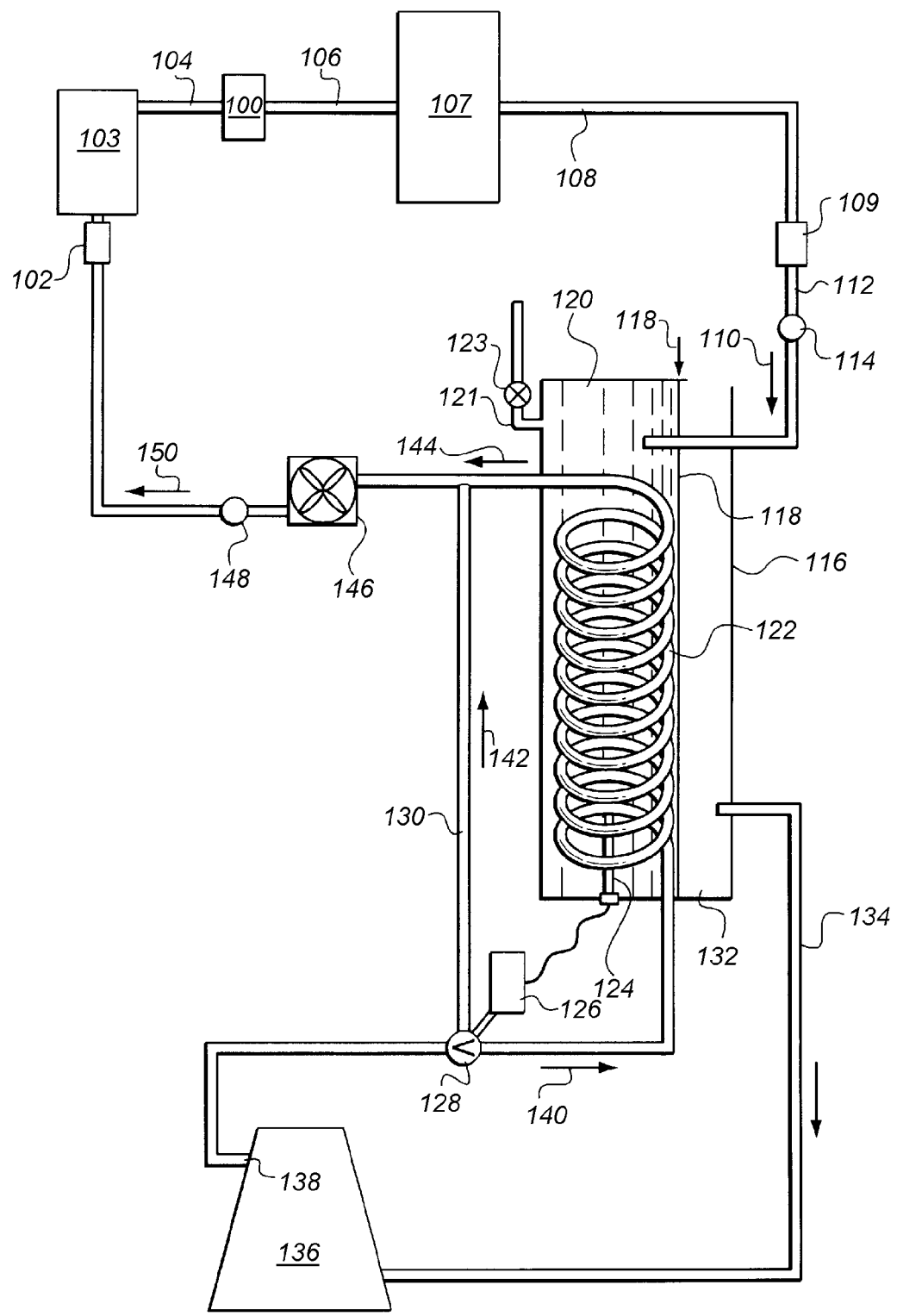
FIG. 3 shows a schematic drawing of a partial distillation system for removing oil from a refrigerant flow stream.

As shown in FIG. 3, a refrigerant cleansing system provides an inlet 112 for receiving refrigerant from the condenser, a purification system employing a controlled distillation process, and an outlet 150 for returning purified refrigerant. This portion of the system is similar to the system described in U.S. Pat. No. 5,377,499, expressly incorporated herein by reference.

The compressor 100 compresses the refrigerant to a hot, dense gas. The condenser 107, sheds the heat in the gas, resulting from the compressor 100. A small amount of compressor oil is carried with the hot gas to the condenser 107, where it condenses, with the refrigerant, into a mixed liquid. The liquefied, cooled refrigerant (and oil) exits the condenser through line 108. Isolation valves 102, 109 are provided to selectively allow insertion of a partial distillation apparatus 105 within the refrigerant flow path. As shown, a fitting 14 receives the flow of refrigerant contents from the condenser 107 of the refrigeration system, though line 108. The refrigerant from the partial distillation apparatus 105 is received by the evaporator 103 through the isolation valve 102.

The partial distillation apparatus 105 is capable of boiling contaminated refrigerant in a distillation chamber 130 without the need for external electrical heaters. Furthermore, no cooling water is required. The distillation temperature is controlled by throttling the refrigerant vapor. The distillation is accomplished by feeding contaminated refrigerant, represented by directional arrow 110, through an inlet 112 and a pressure regulating valve 114. The contaminated refrigerant flows into distillation chamber 116, to establish liquid level 118 of contaminated refrigerant liquid 120. A contaminated liquid drain 121 is also provided, with valve 123. A high surface area conduit, such as a helical coil 122, is immersed beneath the level 118 of contaminated refrigerant liquid. Thermocouple 124 is placed at or near the center of coil 122 for measuring distillation temperature for purposes of temperature control unit 126. In turn, the temperature control unit controls the position of three-way valve 128, so that the distillation temperature will be set at a constant value at approximately thirty degrees Fahrenheit (for R22 refrigerant). Temperature control valve 128 operates in a manner, with bypass conduit 130, so that, as vapor is collected in the portion 132 of distillation chamber 116 above liquid level 118, it will feed through conduit 134 to compressor 136. This creates a hot gas discharge at the output 138 of compressor 136, such that those hot gases feed through three-way valve 128, under the control of temperature control 126. In those situations where thermocouple 124 indicates a distillation temperature above thirty degrees Fahrenheit, as an example, bypass conduit 130 will receive some flow of hot gases from compressor 136. Conversely, in those situations where thermocouple 124 indicates a temperature below thirty degrees Fahrenheit, as an example, the flow of hot gases will proceed as indicated by arrow 140 into helical coil 122. When thermometer 124 indicates certain values of temperature near thirty degrees Fahrenheit, hot gases from the compressor are allowed to flow partially along the bypass conduit and partially into the helical coil to maintain the thirty degree temperature. For differing refrigerants or mixtures, the desired boiling temperature may vary, and thus the temperature may be controlled accordingly. Flow through bypass conduit 130 and from helical coil 122, in directions 142, 144, respectively, will pass through auxiliary condenser 146 and pressure regulating valve 148 to produce a distilled refrigerant outlet indicated by directional arrow 150. Alternatively, condenser 146 is controlled by an additional temperature control unit, controlled by the condenser output temperature.

Thus, oil from the condenser 107 is removed before entering the evaporator 105. By running the system over time, oil accumulation in the evaporator 103 will drop, thus cleansing the system.

Figure 4:
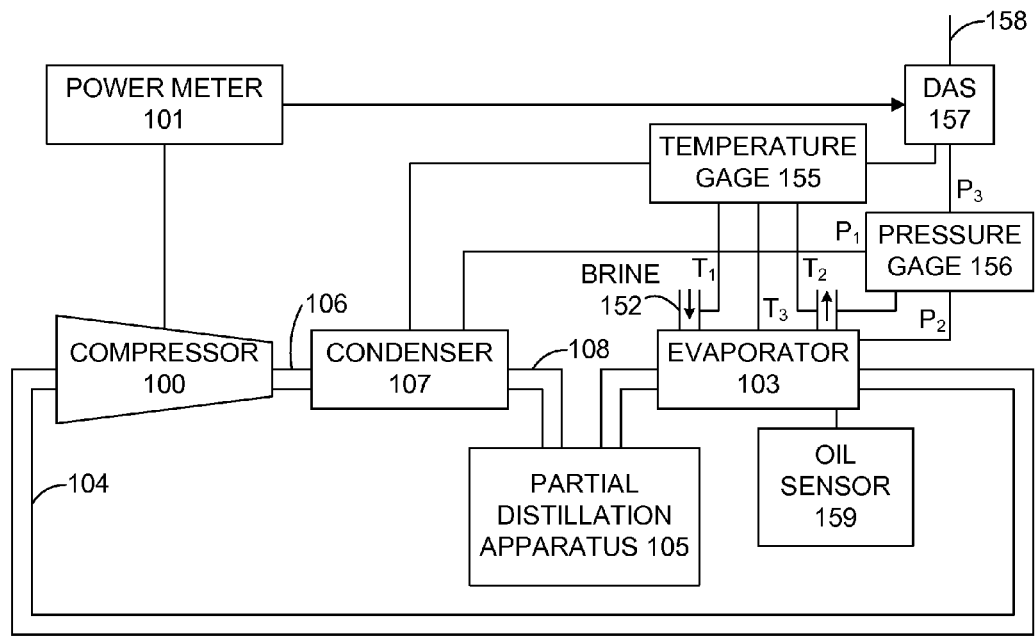
FIG. 4 shows a schematic of a chiller efficiency measurement system.

FIG. 4 shows an instrumented chiller system, allowing periodic or batch reoptimization, or allowing continuous closed loop feedback control of operating parameters. Compressor 100 is connected to a power meter 101, which accurately measures power consumption by measuring Volts and Amps drawn. The compressor 100 produces hot dense refrigerant vapor in line 106, which is fed to condenser 107, where latent heat of vaporization and the heat added by the compressor 100 is shed. The refrigerant carries a small amount of compressor lubricant oil. The condenser 107 is subjected to measurements of temperature and pressure by temperature gage 155 and pressure gage 156. The liquefied, cooled refrigerant, including a portion of mixed oil, if fed through line 108 to an optional partial distillation apparatus 105, and hence to evaporator 103. In the absence of the partial distillation apparatus 105, the oil from the condenser 107 accumulates in the evaporator 103. The evaporator 103 is subjected to measurements of refrigerant temperature and pressure by temperature gage 155 and pressure gage 156. The chilled water in inlet line 152 and outlet line 154 of the evaporator 103 are also subject to temperature and pressure measurement by temperature gage 155 and pressure gage 156. The evaporated refrigerant from the evaporator 103 returns to the compressor through line 104.

The power meter 101, temperature gage 155 and pressure gage 156 each provide data to a data acquisition system 157, which produces output 158 representative of an efficiency of the chiller, in, for example, BTU/kWH. An oil sensor 159 provides a continuous measurement of oil concentration in the evaporator 103, and may be used to control the partial distillation apparatus 105 or determine the need for intermittent reoptimization, based on an optimum operating regime. The power meter 101 or the data acquisition system 157 may provide surrogate measurements to estimate oil level in the evaporator or otherwise a need for oil removal.

Figure 5:
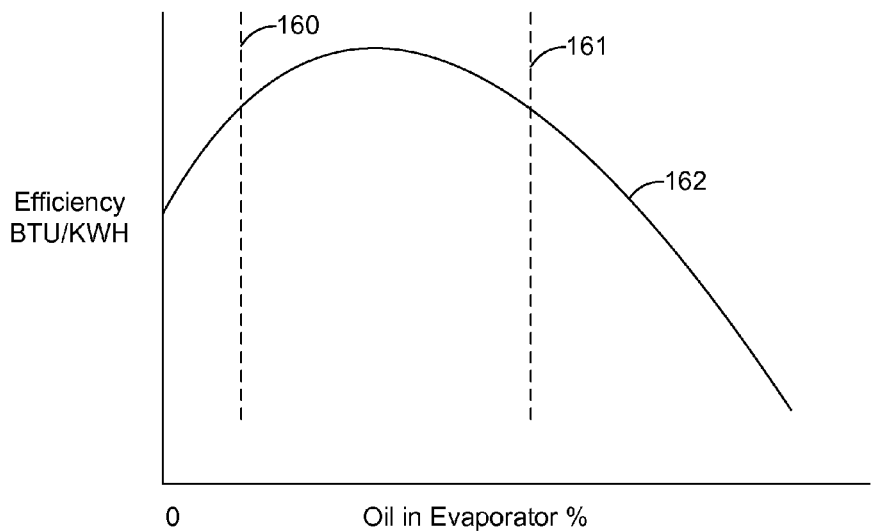
FIG. 5 shows a stylized representative efficiency graph with respect to changes in evaporator oil concentration.
Figure 6A:
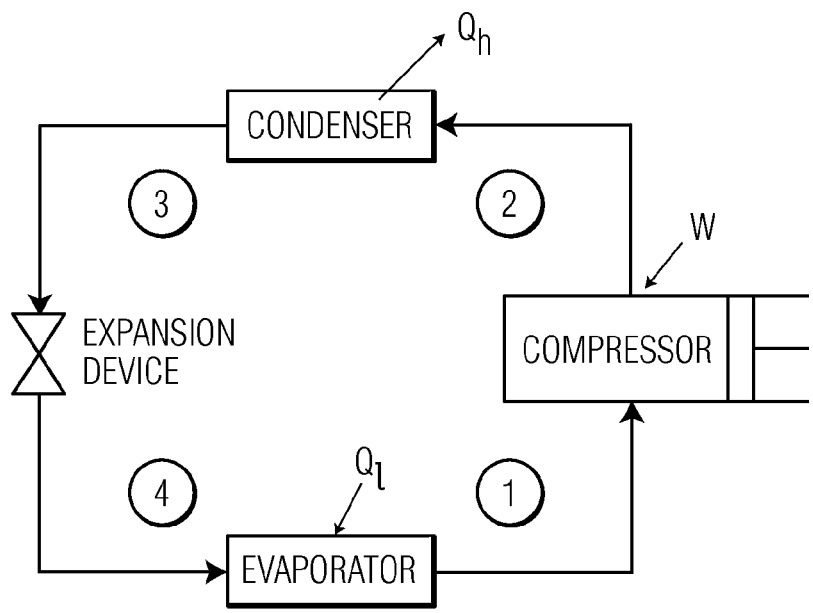
FIGS. 6A and 6B show, respectively, a schematic of a vapor compression cycle and a temperature-entropy diagram.
Figure 6B:
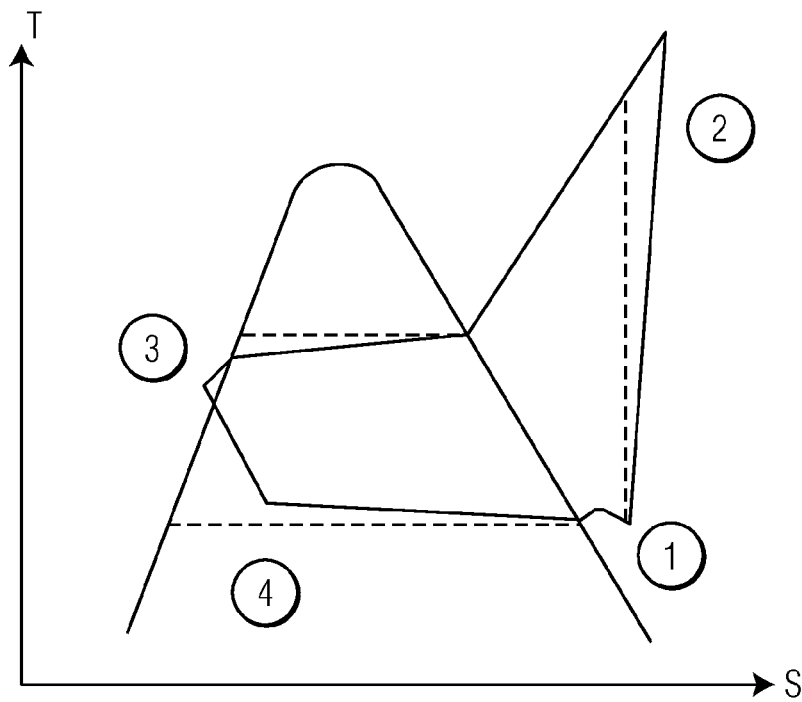

As shown in FIG. 5, the efficiency of the chiller varies with the oil concentration in the evaporator 103. Line 162 shows a non-monotonic relationship. After the relationship is determined by plotting the efficiency with respect to oil concentration, an operating regime may thereafter be defined. While typically, after oil is removed from the evaporator 103, it is not voluntarily replenished, a lower limit 160 of the operating regime defines, in a subsequent removal operation, a boundary beyond which it is not useful to extend. Complete oil removal is not only costly and directly inefficient, it may also result in reduced system efficiency. Likewise, when the oil level exceeds an upper boundary 161 of the operating regime, system efficiency drops and it is cost effective to service the chiller to restore optimum operation. Therefore, in a close loop feedback system, the distance between the lower boundary 160 and upper boundary will be much narrower than in a periodic maintenance system. The oil separator (e.g., partial distillation apparatus 105 or other type system) in a closed loop feedback system is itself typically less efficient than a larger system typically employed during periodic maintenance, so there are advantages to each type of arrangement.

Example 2

Figure 7A:
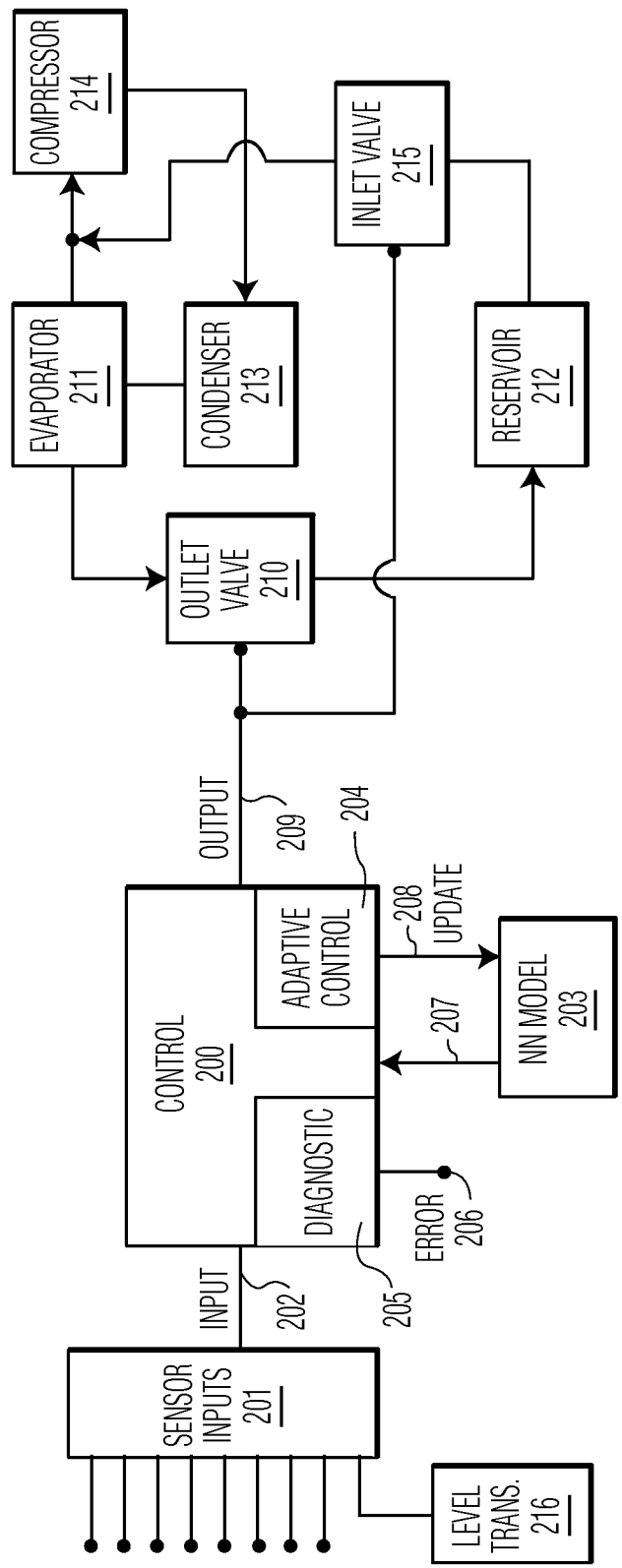
FIGS. 7A, 7B and 7C show, respectively, different block diagrams of a control according to the present invention.

FIG. 7A shows a block diagram of a first embodiment of a control system according to the present invention. In this system, refrigerant charge is controlled using an adaptive control 200, with the control receiving refrigerant charge level 216 (from a level transmitter, e.g., Henry Valve Co., Melrose Park Ill. LCA series Liquid Level Column with E-9400 series Liquid Level Switches, digital output, or K-Tek Magnetostrictive Level Transmitters AT200 or AT600, analog output), optionally system power consumption (kWatt-hours), as well as thermodynamic parameters, including condenser and evaporator water temperature in and out, condenser and evaporator water flow rates and pressure, in and out, compressor RPM, suction and discharge pressure and temperature, and ambient pressure and temperature, all through a data acquisition system for sensor inputs 201. These variables are fed into the adaptive control 200 employing a nonlinear model of the system, based on neural network 203 technology. The variables are preprocessed to produce a set of derived variables from the input set, as well as to represent temporal parameters based on prior data sets. The neural network 203 evaluates the input data set periodically, for example every 30 seconds, and produces an output control signal 209 or set of signals. After the proposed control is implemented, the actual response is compared with a predicted response based on the internal model defined by the neural network 203 by an adaptive control update subsystem 204, and the neural network is updated 205 to reflect or take into account the "error". A further output 206 of the system, from a diagnostic portion 205, which may be integrated with the neural network or separate, indicates a likely error in either the sensors and network itself, or the plant being controlled.

The controlled variable is, for example, the refrigerant charge in the system. In order to remove refrigerant, liquid refrigerant from the evaporator 211 is transferred to a storage vessel 212 through a valve 210. In order to add refrigerant, gaseous refrigerant may be returned to the compressor 214 suction, controlled by valve 215, or liquid refrigerant pumped to the evaporator 211. Refrigerant in the storage vessel 212 may be subjected to analysis and purification.

Example 3

Figure 7B:
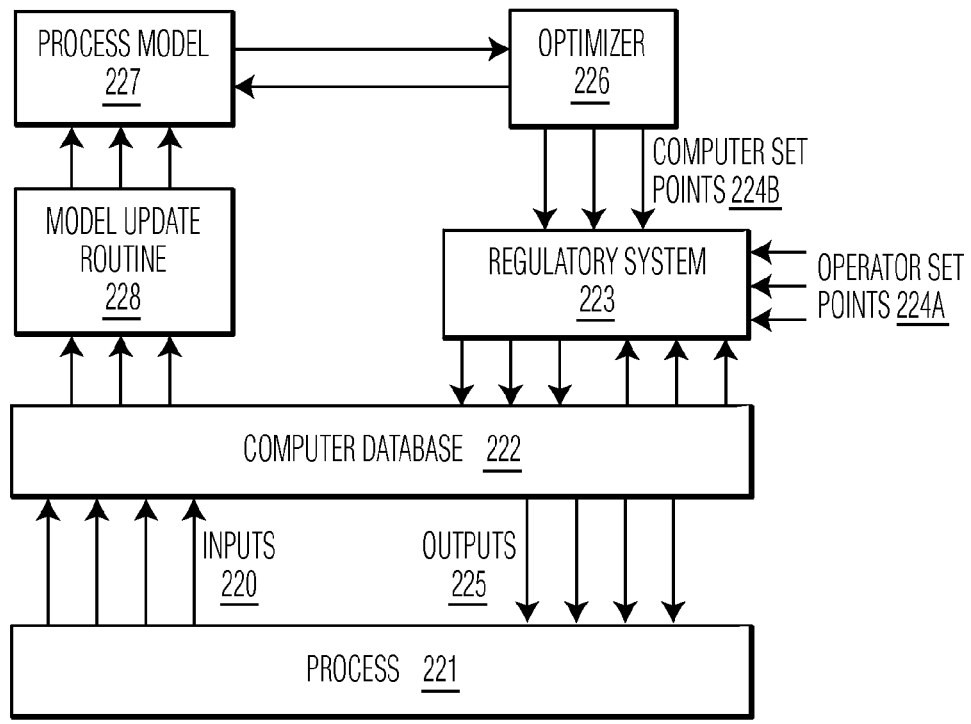

A second embodiment of the control system employs feedfoward optimization control strategies, as shown in FIG. 7B. FIG. 7B shows a signal-flow block diagram of a computer-based feedforward optimizing control system. Process variables 220 are measured, checked for reliability, filtered, averaged, and stored in the computer database 222. A regulatory system 223 is provided as a front line control to keep the process variables 220 at a prescribed and desired slate of values. The conditioned set of measured variables are compared in the regulatory system 223 with the desired set points from operator 224A and optimization routine 224B. Errors detected are then used to generate control actions that are then transmitted as outputs 225 to final control elements in the process 221. Set points for the regulatory system 223 are derived either from operator input 224A or from outputs of the optimization routine 224B. Note that the optimizer 226 operates directly upon the model 227 in arriving at its optimal set-point slate 224B. Also note that the model 227 is updated by means of a special routine 228 just prior to use by the optimizer 227. The feedback update feature ensures adequate mathematical process description in spite of minor instrumentation errors and, in addition, will compensate for discrepancies arising from simplifying assumptions incorporated in the model 227. In this case, the controlled variable may be, for example, compressor speed, alone or in addition to refrigerant charge level.

The input variables are, in this case, similar to those in Example 2, including refrigerant charge level, optionally system power consumption (kWatt-hours), as well as thermodynamic parameters, including condenser and evaporator water temperature in and out, condenser and evaporator water flow rates and pressure, in and out, compressor RPM, suction and discharge pressure and temperature, and ambient pressure and temperature.

Example 4

Figure 7C:
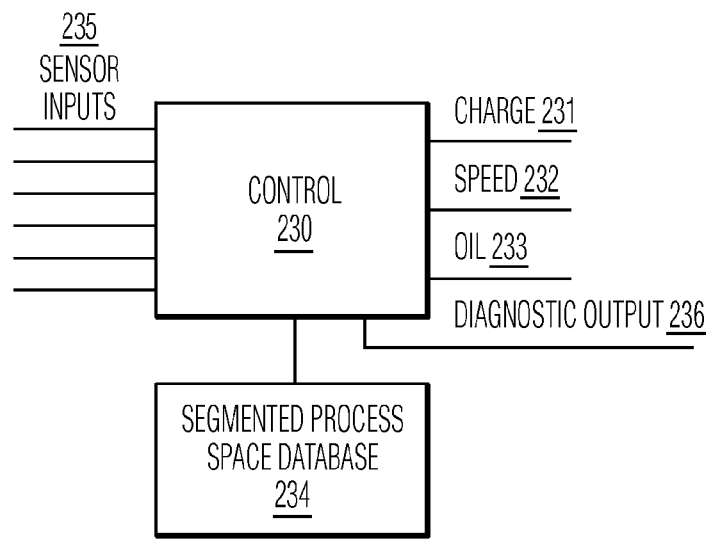

As shown in FIG. 7C, a control system 230 is provided which controls refrigerant charge level 231, compressor speed 232, and refrigerant oil concentration 233 in evaporator. Instead of providing a single complex model of the system, a number of simplified relationships are provided in a database 234, which segment the operational space of the system into a number of regions or planes based on sensor inputs. The sensitivity of the control system 230 to variations in inputs 235 is adaptively determined by the control during operation, in order to optimize energy efficiency.

Data is also stored in the database 234 as to the filling density of the operational space; when the set of input parameters identifies a well populated region of the operational space, a rapid transition is effected to achieve the calculated most efficient output conditions. On the other hand, if the region of the operational space is poorly populated, the control 230 provides a slow, searching alteration of the outputs seeking to explore the operational space to determine the optimal output set. This searching procedure also serves to populate the space, so that the control 230 will avoid the naïve strategy after a few encounters.

In addition, for each region of the operational space, a statistical variability is determined. If the statistical variability is low, then the model for the region is deemed accurate, and continual searching of the local region is reduced. On the other hand, if the variability is high, the control 230 analyzes the input data set to determine a correlation between any available input 235 and the system efficiency, seeking to improve the model for that region stored in the database 234. This correlation may be detected by searching the region through sensitivity testing of the input set with respect to changes in one or more of the outputs 231, 232, 233. For each region, preferably a linear model is constructed relating the set of input variables and the optimal output variables. Alternately, a relatively simple non-linear network, such as a neural network, may be employed.

The operational regions, for example, segment the operational space into regions separated by 5% of refrigerant charge level, from −40% to +20% of design, oil content of evaporator by 0.5% from 0% to 10%, and compressor speed, from minimum to maximum in 10-100 increments. It is also possible to provide non-uniformly spaced regions, or even adaptively sized regions based on the sensitivity of the outputs to input variations at respective portions of the input space.

The control system also provides a set of special modes for system startup and shutdown. These are distinct from the normal operational modes, in that energy efficiency is not generally a primary consideration during these transitions, and because other control issues may be considered important. These modes also provide options for control system initialization and fail-safe operation.

It is noted that, since the required update time for the system is relatively long, the neural network calculations may be implemented serially on a general purpose computer, e.g., an Intel Pentium III processor running Windows NT or a real time operating system, and therefore specialized hardware is typically not necessary.

It is preferred that the control system provide a diagnostic output 236 which "explains" the actions of the control, for example identifying, for any given control decision, the sensor inputs which had the greatest influence on the output state. In neural network systems, however, it is often not possible to completely rationalize an output. Further, where the system detects an abnormal state, either in the plant being controlled or the controller itself, it is preferred that information be communicated to an operator or service engineer. This may be by way of a stored log, visual or audible indicators, telephone or Internet telecommunications, control network or local area network communications, radio frequency communication, or the like. In many instances, where a serious condition is detected and where the plant cannot be fully deactivated, it is preferable to provide a "failsafe" operational mode until maintenance may be performed.

The foregoing description of the preferred embodiment of the invention has been presented for purposes of illustration and description and is not intended to be exhaustive or to limit the invention to the precise forms disclosed, since many modifications and variations are possible in light of the above teaching. Some modifications have been described in the specifications, and others may occur to those skilled in the art to which the invention pertains.

What is claimed is:

1. A multivariate system for controlling a refrigeration system, comprising:
    a plurality of inputs which together represent a plurality of independent variables representing a thermodynamic operational state of the refrigeration system;

a memory storing data describing a thermodynamic predictive mathematical model of the refrigeration system associated with the plurality of inputs, the model being adaptively defined based on prior operational states of the plurality of inputs and having at least one adaptively defined timeconstant;

at least one processor, configured to receive the plurality of inputs, to access the stored model, to perform an analysis of the model with respect to the plurality of inputs to determine a probable deviance from an optimal operating point, and to determine change in the operational state of the refrigeration system to achieve a predicted most-efficient operational state; and an output port configured to present an output signal representing the determined change in the operational state.

2. The system according to claim 1, wherein the at least one processor is further configured to generate a revised model when an actual performance of the refrigeration system does not correspond to the model stored in the memory.

3. The system according to claim 1, wherein the output signal comprises at least two control signals adapted for independently controlling different physical elements of the refrigeration system.

4. The system according to claim 1, wherein the predicted most-efficient operational state is a predicted most cost-efficient operational state of the refrigeration system.

5. The system according to claim 1, wherein the predicted most-efficient operational state is a predicted most cost-efficient operational state of the refrigeration system and a process which produces heat removed by the refrigeration system.

6. The system according to claim 1, wherein the at least one processor is configured to accounts for a plurality of time delays inherent in the refrigeration system and a process which produces heat removed by the refrigeration system.

7. The system according to claim 1, wherein the model accounts for a time response of the refrigeration system, and the processor is configured to selectively define at least one dynamic control variable for the refrigeration system in a manner which damps an oscillation of the refrigeration system.

8. The system according to claim 1, wherein the plurality of inputs comprise at least two different temperatures and at least two different temperatures of different portions of the refrigeration system which are concurrently presented.

9. The system according to claim 1, wherein the at least one processor is configured to analyze the model to define a physical remediation representing an external change to the refrigeration system adapted to increase an efficiency of the refrigeration system over a range of operating conditions, based on at least a change in the refrigeration system inferred from the plurality of inputs since a prior remediation was completed.

10. A method for controlling a refrigeration system, comprising:

receiving a plurality of inputs which together represent a plurality of independent variables representing a thermodynamic operational state of the refrigeration system;

storing data describing a thermodynamic predictive mathematical model of the refrigeration system associated with the plurality of inputs in a memory, the model being adaptively defined based on prior operational states of the plurality of inputs and having at least one adaptively defined timeconstant;

performing an analysis of the model, using at least one automated processor, with respect to the plurality of inputs to:
determine a probable deviance from an optimal operating point, and
determine change in the operational state of the refrigeration system to achieve a predicted most-efficient operational state; and presenting an output signal representing the determined change.

11. The method according to claim 10, wherein the output signal represents a control signal for dynamically controlling the refrigeration system, further comprising controlling the refrigeration system selectively in dependence on the output signal to tend toward the predicted most-efficient operational state.

12. The method according to claim 10, further comprising generating a revised model when an actual performance of the refrigeration system does not correspond to the model.

13. The method according to claim 10, wherein the output signal comprises at least two control signals for independently controlling different physical elements of the refrigeration system.

14. The method according to claim 10, wherein the predicted most-efficient state is a predicted most cost-efficient operational state of the refrigeration system and a process which produces heat removed by the refrigeration system.

15. The method according to claim 10, further comprising accounting for a plurality of time delays in order to produce the output signal.

16. The method according to claim 10, wherein the model accounts for a time response of the refrigeration system, further comprising selectively defining at least one dynamic control variable for the refrigeration system in a manner which damps an oscillation of the refrigeration system.

17. The method according to claim 10, wherein the plurality of inputs comprise at least two different temperatures and at least two different temperatures of different portions of the refrigeration system which are concurrently presented.

18. The method according to claim 10, further comprising analyzing the model to determine a physical remediation representing an external change to the refrigeration system adapted to increase an efficiency of the refrigeration system over a range of operating conditions, based on at least a change in the refrigeration system inferred from the plurality of inputs since a prior remediation was completed.

19. The method according to claim 18, wherein the physical remediation comprises a physical removal of impurities from at least a refrigerant in an evaporator of the refrigeration system.

20. A method for controlling a thermodynamic system comprising a compressible gas, a compressor, and an expander, comprising:

receiving a plurality of inputs which represent a thermodynamic state of the compressor, and a thermodynamic state of the expander, and together having sufficient information to derive an efficiency of the thermodynamic system;

storing data describing a mathematical model of the thermodynamic system associated with the plurality of inputs in a memory, the model being adaptively defined and having at least one dynamically changing timeconstant;

performing an analysis of the model, using at least one automated processor, with respect to the plurality of inputs to:

determine a probable deviance from an optimal efficiency, and
determine change in an operational state of the thermodynamic system to achieve a state representing the optimal efficiency; and
presenting an output signal for controlling the thermodynamic system selectively defined in dependence on the determined change.

* * * * *